United States Patent
LaForest (10) Patent No.: US 8,533,601 B2
(45) Date of Patent: Sep. 10, 2013

(54) SYSTEM AND METHOD FOR MONITORING SERVERS OF A DATA CENTER

(75) Inventor: Mark LaForest, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 964 days.

(21) Appl. No.: 11/850,844

(22) Filed: Sep. 6, 2007

(65) Prior Publication Data

US 2009/0070697 A1    Mar. 12, 2009

(51) Int. Cl.
*G06F 15/177*    (2006.01)
(52) U.S. Cl.
USPC .......................... 715/736; 715/735; 715/772
(58) Field of Classification Search
USPC ......... 715/764, 733–740, 771–772, 853–855; 709/220–221, 223–226
See application file for complete search history.

(56) References Cited

U.S. PATENT DOCUMENTS

| | | | | |
|---|---|---|---|---|
| 5,956,665 A * | 9/1999 | Martinez et al. | ............... | 702/188 |
| 6,980,978 B2 | 12/2005 | Charron et al. | ................... | 707/1 |
| 7,024,474 B2 | 4/2006 | Clubb et al. | ................. | 709/223 |
| 7,574,491 B2 * | 8/2009 | Stein et al. | .................... | 709/220 |
| 7,738,469 B1 * | 6/2010 | Shekokar et al. | ............. | 370/401 |
| 2002/0095487 A1 * | 7/2002 | Day et al. | ...................... | 709/223 |
| 2002/0158898 A1 * | 10/2002 | Hsieh et al. | .................... | 345/736 |
| 2003/0046339 A1 * | 3/2003 | Ip | ................................ | 709/203 |
| 2003/0050998 A1 * | 3/2003 | Garnett et al. | ................ | 709/217 |
| 2003/0200050 A1 * | 10/2003 | Sharma | ......................... | 702/132 |
| 2004/0078711 A1 * | 4/2004 | King et al. | ..................... | 714/43 |
| 2005/0237194 A1 * | 10/2005 | VoBa | ......................... | 340/572.1 |
| 2006/0047466 A1 * | 3/2006 | White | ............................ | 702/130 |
| 2006/0168975 A1 * | 8/2006 | Malone et al. | .................. | 62/180 |
| 2006/0218510 A1 * | 9/2006 | Ward | ............................ | 715/853 |
| 2007/0005382 A1 * | 1/2007 | Sayers | ............................ | 705/1 |
| 2007/0222597 A1 * | 9/2007 | Tourrilhes et al. | ......... | 340/572.1 |
| 2007/0250410 A1 * | 10/2007 | Brignone et al. | ............. | 705/28 |
| 2007/0260417 A1 * | 11/2007 | Starmer et al. | ................. | 702/136 |
| 2008/0123559 A1 * | 5/2008 | Haviv et al. | .................... | 370/255 |
| 2008/0155441 A1 * | 6/2008 | Long et al. | .................... | 715/771 |
| 2009/0012633 A1 * | 1/2009 | Liu et al. | ......................... | 700/90 |

* cited by examiner

*Primary Examiner* — Enrique Iturralde
(74) *Attorney, Agent, or Firm* — Campbell Stephenson LLP (57) ABSTRACT

A system and method for monitoring devices such as servers in one or more data centers. In one embodiment of the method a first graphical user interface is displayed on a computer system such as a desktop computer system. The first graphical user interface may include first and second graphical elements corresponding to first and second system racks, respectively, within a data center. The first system rack may include a plurality of computer systems such as servers. The second system rack may also include a plurality of computer systems such as servers. The first graphical element may include first visual information identifying a location of the first system rack on a floor within the data center, and the second graphical element may include second visual information identifying a location of the second system rack on the floor within the data center.

22 Claims, 4 Drawing Sheets

FIG. 1

|   | 1 | 2 | 3 | 4 | 5 | 6 | 7 | 8 |
|---|---|---|---|---|---|---|---|---|
| A | 38(1) | 38(2) | 38(3) | 38(4) | 38(5) | 38(6) | 38(7) | 38(8) |
| B | 38(9) | 38(10) | 38(11) | 38(12) | 38(13) | 38(14) | 38(15) | 38(16) |
| C | 38(17) | 38(18) | 38(19) | 38(20) | 38(21) | 38(22) | 38(23) | 38(24) |
| D | 38(25) | 38(26) | 38(27) | 38(28) | 38(29) | 38(30) | 38(31) | 38(32) |

SYSTEM AND METHOD FOR MONITORING SERVERS OF A DATA CENTER

BACKGROUND OF THE INVENTION

Data centers employ thousands of computer systems (e.g., servers), each of which may need to be monitored for proper operation. However, the act of monitoring a large number of servers in a large data center may be challenging. For example, when a malfunctioning server is identified, the act of determining the actual location of the server within the data center may be difficult. Usually a system administrator consults a physical map to locate the location in the data center where the identified, malfunctioning server can be found.

SUMMARY OF THE INVENTION

A system and method for monitoring devices such as servers in one or more data centers. In one embodiment of the method a first graphical user interface is displayed on a computer system such as a desktop computer system. The first graphical user interface may include first and second graphical elements corresponding to first and second system racks, respectively, within a data center. The first system rack may include a plurality of computer systems such as servers, and the second system rack may also include a plurality of computer systems such as servers. The first graphical element may include first visual information identifying a location of the first system rack on a floor within the data center, and the second graphical element may include second visual information identifying a location of the second system rack on the floor within the data center.

DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

The present invention provides an apparatus or method for monitoring computers (e.g., servers) or other devices within one or more data centers. In the following description, the present invention can be implemented as a computer program executing on one or more processors of a computer system, although those skilled in the art will readily recognize the equivalent of such software may also be constructed in hardware or a combination of hardware and software. If the present invention is implemented as a computer program, the program may be stored in a conventional computer readable medium that may include, for example: magnetic storage media such as a magnetic disk (e.g., a disk drive); optical storage media such as an optical disk; solid state electronic storage devices such as random access memory (RAM), or read only memory (ROM); or any other device or medium employed to store computer program instructions.

Figure 1:
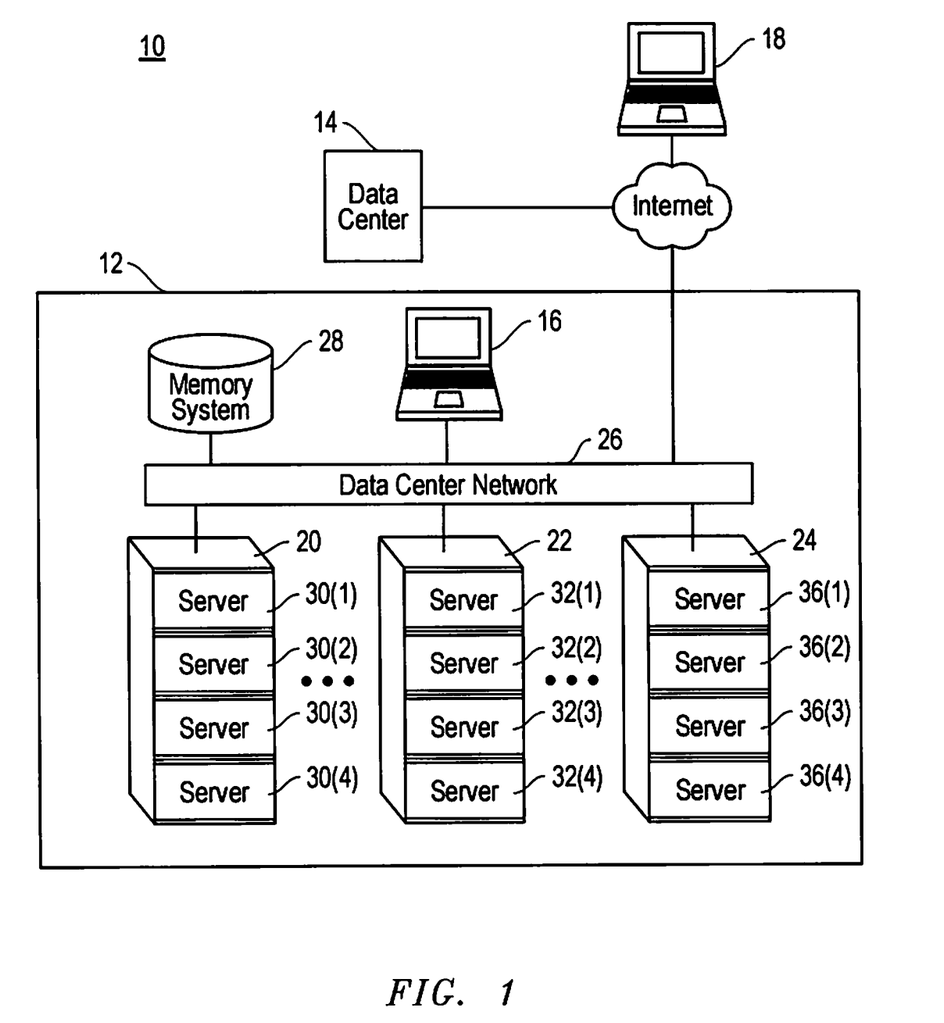
FIG. 1 is a simplified block diagram showing relevant components of a system in which one embodiment of the present invention can be implemented.

FIG. 1 illustrates, in block diagram form, relevant components of a system 10 employing one embodiment of the present invention, it being understood the present invention can be employed in a system other than that shown within FIG. 1. System 10 includes data centers 12 and 14 that contain devices (e.g., servers) that are coupled to a monitoring system 16 (hereinafter monitor 16). Specifically, monitor 16 is coupled to servers contained in rack systems 20-24 via data center network 26. Although FIG. 1 shows only three rack systems 20-24, it should be understood that data center 12 includes additional rack systems. Indeed, current data centers may include several hundred rack systems that are loaded with functioning servers. Each of the rack systems, including rack systems 20-24, contains several servers (e.g., blade servers). Rack systems 20-24 are shown containing four servers each, it being understood, that rack systems in general can hold more than four servers. Although not shown, data center 14 also includes several rack systems such as rack systems 20-24, each containing several servers.

Each of the servers in rack systems 20-24 is in data communication with monitor 16 via data center network 26. Although not shown, each of the servers in data center 14 may also be in data communication with monitor 16 via data center network 26 and another network (e.g., the Internet as shown). Network 26 may take form in several nodes (e.g., switches, routers, etc.) that enable communication between monitor 16 and servers in rack systems 20-24 or between monitor 16 and servers within rack systems of data center 14 using any on of several well known communication protocols.

FIG. 1 further shows a monitor system 18 (hereinafter monitor 18) coupled to devices in data centers 12 and 14 via the Internet. Servers or other devices within data centers 12 and 14 may be monitored using monitor 16 or monitor 18 in accordance with the invention more fully described below. Monitor 18 provides the same or similar functional features as monitor 16, which are more fully described below. The present invention will be described with reference to monitor 16, it being understood that the functional aspects described below with reference to monitor 16 are likewise provided by monitor 18. Moreover, the present invention will be described with reference to monitor 16 monitoring servers contained in data center 12, it being understood that monitor 16 can monitor servers contained in data center 14 in similar fashion.

FIG. 1 shows data center 12 having a memory system 28 that may take form in one or more memory devices such as hard disks in one or more disk arrays. Memory system 28 stores data objects that are accessible by monitor 16. In general, the data objects may take many different forms including files within a file system, tables within databases, etc. Data objects in memory system 28 may be linked to other data objects. Some data objects may contain system information about servers (e.g., servers 32(1)-32(4)) within data center 12. Other data objects may contain information about racks (e.g., racks 22 and 24) within the data center. Other data objects are contemplated. Monitor 16 can read and subsequently display contents of the data objects in one or more graphical user interfaces (GUIs) that are more fully described below. In one embodiment, the GUIs may be web based such that a remote computer system that is coupled to the Internet, may provide the GUIs described below.

As noted, data objects in memory system 28 may store information about respective servers, rack systems, etc., in data center 12. For example, a data object relating to a server in data center 12 may contain: the server type; the server location within the data center; the type of operating system executing on the server; the number and speed of CPUs within the server; the size of RAM memory within the server; server model number, etc. The data object for the server may include information identifying a type of remote access console (RAC) and a link thereto, which can be used to remotely access and manage the corresponding server by, for example, adjusting one or more parameters or settings of the server. The data object may include information identifying the current status of the corresponding server. For example, the current status in a data object may indicate that the corresponding server is operable (i.e., functioning within normal parameters), inoperable due to hardware and/or software error(s), in reserve, etc. The data object for the server may also include information identifying a geographical location within the data center 12 where the rack system that contains the corresponding server, can be found. The geographical location information may take form in coordinates of a grid representing the floor space within the data center.

Figure 2:
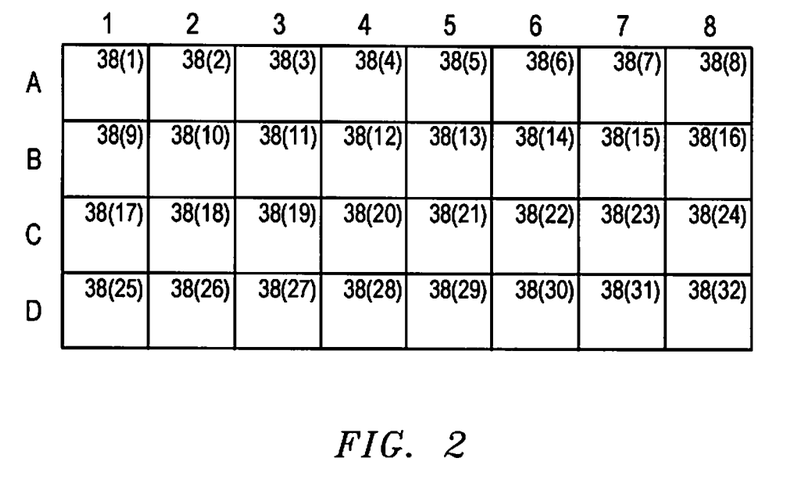
FIG. 2 illustrates a graphical representation of an elevated tile floor (or a portion thereof) in a data center 12.

Data centers generally have an elevated floor system built as an array of floor tiles each measuring 24-inches by 24-inches. This type of floor can be graphically represented as a grid. FIG. 2 illustrates a graphical representation 36 of an elevated tile floor (or a portion thereof) in data center 12. More particularly, the graphical representation 36 consists of grid elements 38, each one of which represents a 24-inch by 24-inch tile in the floor of data center 12. Each grid element 38 (and corresponding floor tile) can be identified by row, column coordinates. For example, the grid element 38(8) in the top right hand corner in FIG. 2 is identified by grid coordinates A8, which indicates the grid element represents a tile contained within row A and column 8 of the tile floor in data center 12. Data objects in memory system 28 relating to respective rack systems of data center 12 may also contain information (i.e., grid coordinates) identifying a geographical location on the data center 12 floor.

Memory system 28, as noted above, may store other data objects, such as data objects related to GUIs that can be presented to a system administrator via monitor 16 as will be more fully described below. Information within the data objects may be accessed directly or indirectly via read or write transactions generated by monitor 16 or other systems. For example, the status in a data object corresponding to a server may be switched from "operable" to "inoperable" by a transaction generated by monitor 16. Information within the data objects may be accessed directly or indirectly via read or write transactions generated by devices other than monitor 16.

Monitor 16 can perform many distinct functions. For example, monitor 16 is capable of periodically sending "ping" messages to each of the servers contained within data center 12 via network 26. In response to receiving a ping message, each server, if operating properly, returns an acknowledgement message to monitor 16 via network 26. If, however, an acknowledgement to a ping is not returned from a particular server in a predetermined amount of time, monitor 16 may deem that server inoperable as a result of software and/or hardware failure, and monitor 16 may access the data object in memory system 28 that corresponds to the server and change the server's status from "operable" to "inoperable." Monitor 16 is capable of sending a restart message to a server if the server fails to acknowledge receipt of a ping message within a predetermined amount of time. The server, in response to receiving the restart message, may restart itself. If the server successfully restarts itself, the server should be able to acknowledge receipt of a subsequent ping message sent by monitor 16. In response to receiving the ping acknowledgment, monitor 16 may again access the data object in memory 28 for the server and change its status back to "operable."

Monitor 16 is also capable of sending messages to servers of data center 12 that are more complex than pings. For example, monitor 16 can send simple network monitoring protocol (SNMP) messages, which are designed to poll operating parameters or settings of servers. A server in response to receiving an SNMP query may return a substantial amount of information about itself when compared to a simple ping acknowledgement. This information may include CPU utilization, hard drive usage, storage volume usage, system load, memory usage, and network performance. Monitor 16 is capable of updating information in data objects in memory system 28 using the information returned by respective servers in response to receiving the SNMP query or other like messages.

Monitor 16 can present several GUIs to a system administrator. For example, monitor 16 can present a data center view GUI that displays graphical elements that represent corresponding rack systems in data center 12. Monitor 16 can present the data center view GUI after monitor 16 reads a data object (e.g., an HTML file) stored in memory system 28. In one embodiment, the data object may store a web page written in HTML. Each of the graphical elements may include visual information (e.g., grid coordinates) identifying a location of its corresponding system rack on the tile floor within the data center. Each of the graphical elements may also include visual information that provides information relating to one or more servers in its corresponding rack system.

Figure 3:
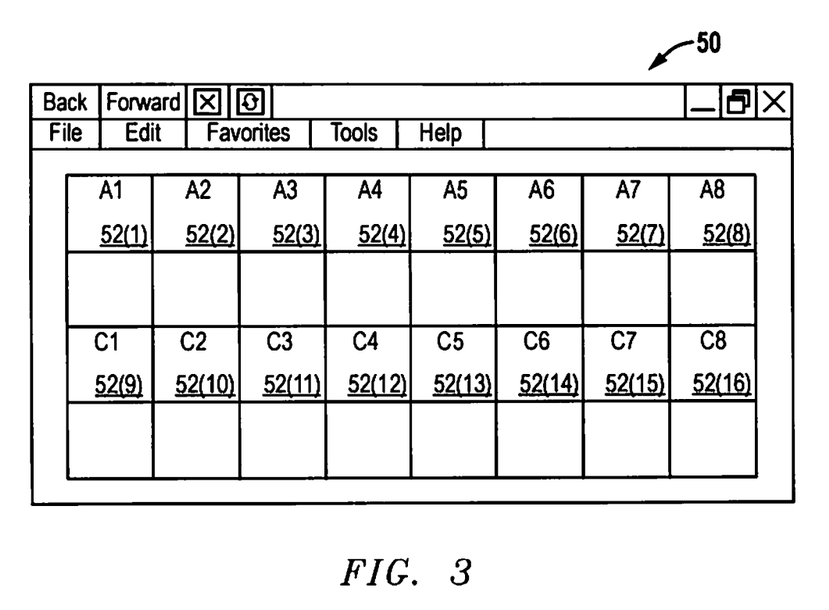
FIG. 3 illustrates an example data center view graphical user interface (GUI) that may be provided to a system administrator in accordance with one embodiment of the present invention.

FIG. 3 illustrates an example data center view GUI 50 that may be presented by monitor 16 to a system administrator. GUI 50 includes graphical elements 52(1)-52(16) representing respective rack systems in data center 12. For example, graphical elements 52(3), 52(9), and 52(15) correspond to rack systems 20, 22, and 24, respectively, of FIG. 1. Each of the graphical elements of the data center view GUI 50 may include a visual indication that identifies the geographical location of its corresponding rack system within data center 12. In the embodiment shown in FIG. 3, the visual indication takes form of grid coordinates on the data center floor where the corresponding rack system can be found. For example, graphical element 52(3), representing rack system 20 shown in FIG. 1, displays grid coordinates "A3" thus indicating that rack system 20 is positioned in row A, column 3 of the tile floor in data center 12. Because the data center view GUI displays visual indications of rack system locations in data center 12, the data center view GUI enables system administrators to identify the geographical location in data center 12 where each represented rack system can be found without having to resort to a separate map that maps rack systems, and the servers contained therein, to floor locations in the data center.

Each graphical element of data center view GUI may display additional information relating to its respective rack system or a server contained therein. For example, the color of a graphical element corresponding to a rack system may indicate whether the rack system contains an inoperable server. To illustrate, each graphical element shown in FIG. 3 is displayed with the same background color (e.g., green), thus indicating that all servers in data center 12 are deemed operable. However, if monitor 16 subsequently deems a server inoperable for failure to acknowledge receipt of a ping message from monitor 16 or another device, monitor 16 may change the background color (e.g., from green to red) of the graphical element corresponding to the rack system that contains the inoperable server. To illustrate, presume the background color of graphical element 52(3) is green thus indicating that each of the servers 30(1)-30(4) contained within rack system 20 (see FIG. 1) is deemed operable. Thereafter, presume server 30(2) fails to acknowledge receipt of a ping message from monitor 16. In response, monitor 16 may access the data object in memory system 28 which corresponds to server 30(2) and update the status information to indicate that the server is inoperable.

Figure 4:
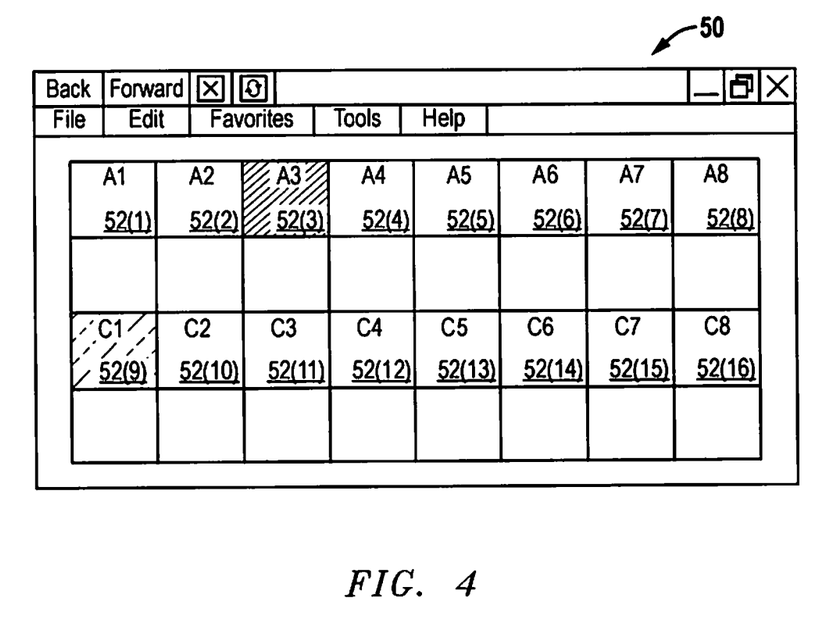
FIG. 4 shows the GUI of FIG. 3 after it is refreshed in accordance with one embodiment of the present invention.

Monitor 16 periodically refreshes GUI 50 to current information stored in one or more data objects in memory system 28. For example, when monitor 16 refreshes GUI 50 after monitor 16 changes the status information of server 30(2) to inoperable within memory system 28, monitor 16 may change the background color of graphical element 52(3) to provide a visual clue that rack system 20 contains a server that is deemed inoperable. FIG. 4 shows the GUI 50 of FIG. 3 after it is refreshed in accordance with one embodiment. In FIG. 4, graphical element 52(3) is displayed with a different background color (e.g., red) when compared to the background color of graphical element 52(3) in FIG. 3, thus providing a visual indication to a system administrator that rack system 20 contains an inoperable server. In other words, the change of color provides a visual indication to a system administrator that the rack system located at floor grid coordinates A3, contains a server which is inoperable.

Monitor 15 can present a rack system view GUI that displays graphical elements corresponding to servers in a rack system of data center 12. In one embodiment, each graphical element 52(x) of data center view 50 shown in FIGS. 3 and 4 may correspond to a data element in an HTML table of a file stored in memory system 28. Each of these HTML data elements may contain a hyper text link to a respective data object (e.g., another HTML file) stored in memory system 28, and each of these data objects may correspond to a respective rack system in data center 12. Monitor 16 may present a rack system view GUI when the system administrator initiates a command to display data contained in a data object that corresponds to a link in the HTML table mentioned above. In one embodiment, the command can be initiated by clicking a mouse button while a curser is positioned over a graphical element 52(x) of the data center view GUI. Once the command is initiated, monitor 16 accesses and reads some or all information contained in a data object associated with the link. The information read from the data object can be visually represented in a rack system GUI.

Figure 5:
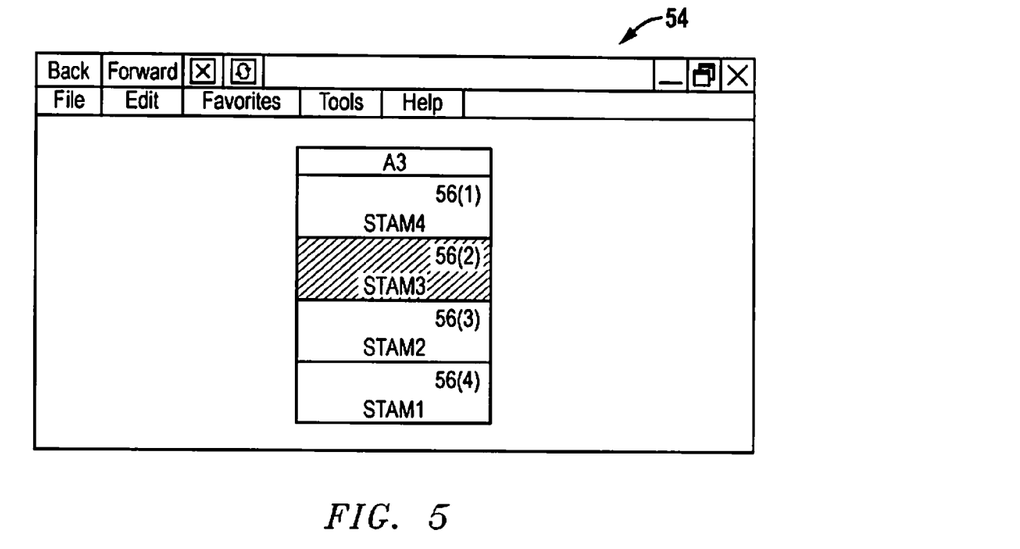
FIG. 5 illustrates an example rack view GUI that may be provided to a system administrator in accordance with one embodiment of the present invention.

FIG. 5 illustrates an example rack view GUI 54, which may be displayed by monitor 16 in response to a system administrator initiating a command to display information in a data object that is identified by a link that corresponds to, for example, graphical element 52(3) of FIG. 4, which in turn corresponds to rack system 20 of FIG. 1. Monitor 16 can present a similar rack view GUI by initiating a command to display information of another data object in memory 28, which is associated with a link that corresponds to another graphical element 52(x) shown in FIG. 4.

With continuing reference to FIG. 5, rack view GUI 54 includes graphical elements 56(1)-56(4) that may correspond to servers 30(1)-30(4), respectively, which are contained in rack system 20 of FIG. 1. Positions of graphical elements 56(1)-56(4) within GUI 54 may correspond to actual, vertical positions of servers 30(1)-30(4), respectively, in rack system 20, as shown in FIG. 1. Additionally, rack view GUI 54 can provide a visual indication of the location on the floor of data center 12 where rack system 20 can be found. For example, GUI 54 displays "A3," the grid coordinates where rack system 20 can be found on the floor of data center 12. Graphical elements 56(1)-56(4) may be displayed with respective visual indications that identify the status of servers 30(1)-30(4), respectively. Graphical elements 56(1)-56(4) may be displayed with the same background color (e.g., green) if corresponding servers 30(1)-30(4), respectively, are operating properly. If, however, one of servers 30(1)-30(4) fails to acknowledge a ping from monitor 16, the server's corresponding graphical element displayed by GUI 54 can be changed to a different color (e.g., red) during a refresh operation to indicate its inoperability. Like data center view GUI 50 described above, monitor 16 may periodically refresh rack view GUI 54 to current information stored in one or more data objects in memory system 28. For example, presume server 30(2) fails to acknowledge receipt of a ping from monitor 16, and monitor 16 in turn updates status indication from operable to inoperable in the data object corresponding to server 30(2). Once the data object is updated, monitor 16 may refresh rack view GUI 54 and change the background color of graphical element 56(2) from green to red in accordance with the status information. By changing the background color of graphical element 56(2) from green to red, rack view GUI54 provides a visual indication to a system administrator that corresponding server 30(2) is not operating properly. FIG. 5 shows graphical element 56(2) presented with a background color which is different from the background colors of graphical elements 56(1) and 56(2)-56(4) thereby indicating that server 30(2) is inoperable.

Monitor 16 can display a server view GUI to a system administrator, which displays information corresponding to a server of data center 12. In one embodiment, each graphical element 56(x) of rack system view 50 shown in FIG. 5 may correspond to a data element in an HTML table of a file stored in memory system 28. Each of these HTML data elements may contain a hyper text link to a respective data object stored in memory system 28, and each of these data objects may correspond to a respective server in data center 12. Monitor 16 may present a server view GUI when the system administrator initiates a command to display information of a data object that corresponds to a link in the HTML table. In one embodiment, the command can be initiated by clicking a mouse button while a curser is positioned over a graphical element 56(x) of the rack view GUI 54. Once the command is initiated, monitor 16 accesses and reads some or all information contained in a data object associated with the URL link. The information read from the data object can be visually presented in a server GUI.

Figure 6:
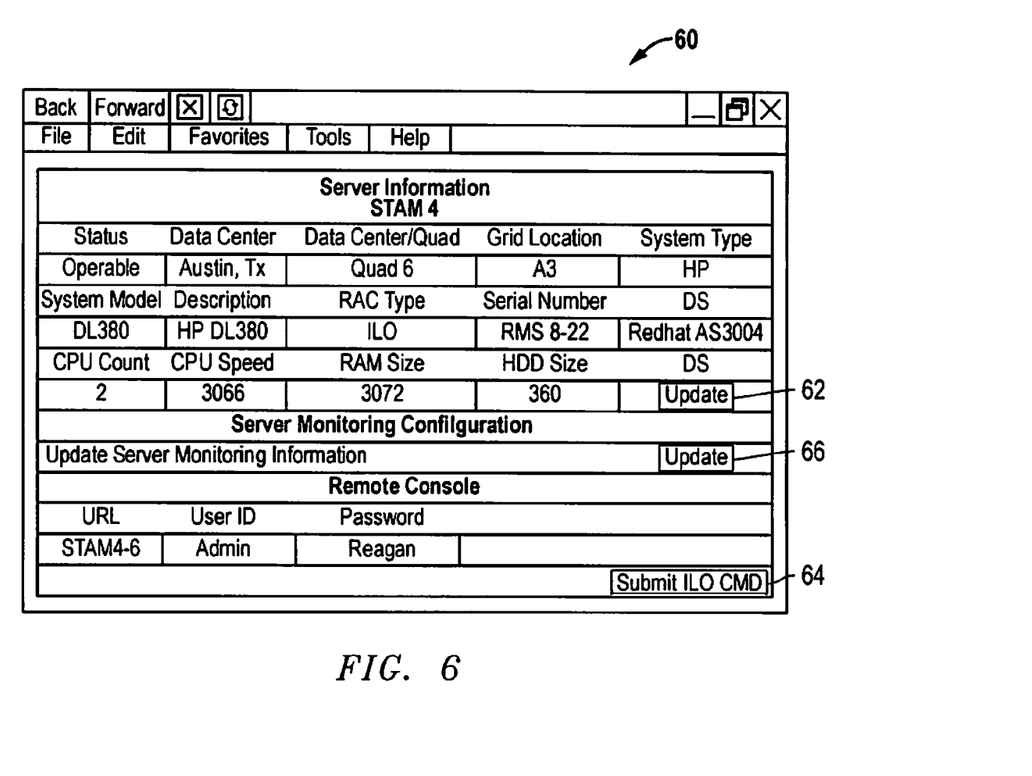
FIG. 6 illustrates an example server view GUI that may be provided to a system administrator in accordance with one embodiment of the present invention.

FIG. 6 illustrates an example server view GUI 60, which may be displayed by monitor 16 in response to a system administrator initiating a command to display information in a data object that is identified by a link that corresponds to graphical element 56(1) of FIG. 4, which in turn corresponds to server 30(1) of FIG. 1. Monitor 16 can present a similar rack view GUI by initiating a command to display information of another data object in memory 28, which is associated with a link that corresponds to another graphical element 56(x) shown in FIG. 5.

With continuing reference to FIG. 6, server view GUI 60 includes various fields that present information stored within a data object in memory system 28, which corresponds to, for example, server 30(1) of FIG. 1. A field identified as "status" indicates the current status of the server (e.g., operable, inoperable, etc.). Again, the status of a server can be ascertained using ping messages that are described above. One or more other fields may identify the location on the floor of data center 12 where the rack system containing the server can be found. In FIG. 6, for example, the field identified as grid location displays "A3," the grid coordinates on the data center floor where the rack containing server 30(1) can be found. Additional server information displayed by GUI 60 includes a description of the server's operating system, CPU speed, RAM size, etc. A button 62 is provided on GUI 60 that enables a system administrator to change the contents of any of the aforementioned fields of GUI 60. For example, the operating system executing on server 30(1) is identified in GUI 60 as "Redhat AS30u4." At some point, the operating system within server 30(1) may be replaced by, for example, a Microsoft Windows based system. When this occurs, a system administrator can update information stored in the data object that corresponds to server 30(1), by first clicking button 62, which in turn causes monitor 16 to present a server information interface (not shown) in which changes to any of the aforementioned fields of GUI 60 may be made. For example, the system administrator may change the identity of the operating system in server information interface from "Redhat AS30u4" to "Windows Server 2003." Although not shown, the server information interface may include a save button that, when activated or clicked, stores the updated information into the data object corresponding to server 30(1). Moreover, clicking on the save button causes GUI 60 to be redisplayed by monitor 16, complete with updated information. The server view GUI may also include a RAC activation button (e.g., update 64) that, when activated, provides a RAC GUI (not shown) that enables the system administrator to remotely access and adjust settings or operational parameters of a server such as server 30(1). An additional system monitoring configuration button 66 in GUI 60 can enables a system administrator to adjust the manner in which the servers are monitored. For example, instead of simply pinging server 30(1) for a return acknowledgment, the system administrator can instruct the server monitoring to include monitoring SNMP, SSH Port, socket, etc.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A method comprising:
sending messages to computer systems in a first system rack and a second system rack;
the computer systems in the first system rack sending replies to the messages;
all but one of the computer systems in the second system rack sending replies to the messages;
displaying a first graphical user interface, wherein the first graphical user interface comprises first and second graphical elements corresponding to the first and second system racks, respectively;
wherein the first graphical element comprises first visual information and a first visual indication, the first visual information identifying a location of the first system rack on a floor within a data center, and the first visual indication indicating that all of the computer systems of the first system rack are operable; and;

wherein the second graphical element comprises second visual information and a second visual indication, the second visual information identifying a location of the second system rack on the floor within the data center, and the second visual indication indicating that the one of the computer systems of the second system rack is inoperable;
subsequent to displaying the first graphical user interface, displaying another graphical user interface that comprises visual information regarding the one of the computer systems of the second system rack;
wherein the visual information regarding the one of the computer systems of the second system rack comprises visual information regarding computer type and model description, operating system, memory size, or number of central processing units (CPUs);
wherein the visual information regarding the one of the computer systems of the second system rack comprises visual information identifying the location of the second system rack on the floor within the data center.

2. The method of claim 1 wherein the first visual information comprises first coordinates of a grid, wherein the second visual information comprises second coordinates of the grid, and wherein the grid corresponds to the floor within the data center.

3. The method of claim 1 wherein the first graphical user interface corresponds to a data object stored in memory, wherein the first and second graphical elements correspond to first and second data elements, respectively, of the data object, and wherein the first and second data elements comprise first and second links, respectively, to first and second data objects, respectively, stored in memory.

4. The method of claim 3 wherein the data object comprises a hyper text mark-up language (HTML) table, wherein the first and second elements comprise first and second table elements, respectively, of the HTML table, and wherein the first and second table elements comprise the first and second links, respectively.

5. The method of claim 4 further comprising an act of displaying a second graphical user interface, wherein the second user interface corresponds to the second data object stored in memory, wherein the second graphical user interface comprises first and second graphical elements corresponding to first and second computer systems, respectively, contained within the second system rack.

6. The method of claim 5 wherein the second data object comprises an HTML table, wherein the first and second graphical elements of the second graphical user interface correspond to first and second table elements, respectively, of the HTML object within the second data object, and wherein the first and second table elements of the HTML table of the second data object comprise third and fourth links, respectively, to third and fourth data objects, respectively, stored in memory.

7. The method of claim 6 wherein the other graphical user interface corresponds to the third data object stored in memory.

8. The method of claim 1 further comprising an act of transmitting a restart message to the one of the computer systems in the second system rack in response to a failure of the one of the computer systems in the second system rack to reply to the message sent to it within a predetermined amount of time.

9. The method of claim 8 further comprising an act of sending another second message to the one of the computer systems in the second system rack after sending the restart message.

10. The method of claim 1 further comprising an act of displaying a second graphical user interface subsequent to displaying the first graphical user interface, wherein the second graphical user interface comprises first and second graphical elements corresponding to the one of the computer systems of the second system rack and another of the computer system of the second system rack, respectively, contained within the second system rack, and wherein the second graphical user interface comprises visual information identifying the location of the second system rack on the floor within the data center.

11. A non-transitory computer readable medium comprising computer executable instructions, where a method is performed by a first computer system in response to executing the instructions, the method comprising:
  sending messages to computer systems in a first system rack and
  a second system rack;
  receiving replies to the messages from the computer systems in the first system rack;
  receiving respective replies to second messages, respectively, from all but one of the computer systems in the second system rack;
  generating a first graphical user interface, wherein the first graphical user interface comprises first and second graphical elements corresponding to the first and second system racks, respectively;
  wherein the first graphical element comprises first visual information and a first visual indication, the first visual information identifying a location of the first system rack on a floor within a data center, and the first visual indication indicating that all of the computer systems of the first system rack are operable, and;
  wherein the second graphical element comprises second visual information and a second visual indication, the second visual information identifying a location of the second system rack on the floor within the data center, and the second visual indication indicating the one of computer systems of the second system rack is inoperable;
  subsequent to displaying the first graphical user interface, generating another graphical user interface that comprises visual information regarding the one of the computer systems of the second system rack;
  wherein the visual information regarding the one of the computer systems of the second system rack comprises visual information regarding computer type and model description, operating system, memory size, or number of central processing units (CPUs);
  wherein the visual information regarding the one of the computer systems of the second system rack comprises visual information identifying the location of the second system rack on the floor within the data center.

12. The non-transitory computer readable medium of claim 11 wherein the first visual information comprises first coordinates of a grid, wherein the second visual information comprises second coordinates of the grid, and wherein the grid corresponds to the floor within the data center.

13. The non-transitory computer readable medium of claim 11 wherein the first graphical user interface corresponds to a data object stored in memory, wherein the first and second graphical elements correspond to first and second data elements, respectively, of the data object, and wherein the first and second data elements comprise first and second links, respectively, to first and second data objects, respectively, stored in memory.

14. The non-transitory computer readable medium of claim 13 wherein the data object comprises a hyper text mark-up language (HTML) table, wherein the first and second elements comprise first and second table elements, respectively, of the HTML table, and wherein the first and second table elements comprise the first and second links, respectively.

15. The non-transitory computer readable medium of claim 14 wherein the method further comprises an act of generating a second graphical user interface, wherein the second graphical user interface corresponds to the second data object stored in memory, wherein the second graphical user interface comprises first and second graphical elements corresponding to first and second computer systems, respectively, contained within the second system rack.

16. The non-transitory computer readable medium of claim 15 wherein the second data object comprises an HTML table, wherein the first and second graphical elements of the second graphical user interface correspond to first and second table elements, respectively, of the HTML object within the second data object, and wherein the first and second table elements of the HTML table of the second data object comprise third and fourth links, respectively, to third and fourth data objects, respectively, stored in memory.

17. The non-transitory computer readable medium of claim 16 wherein the other graphical user interface corresponds to the third data object stored in memory.

18. The non-transitory computer readable medium of claim 11 wherein the method further comprises an act of displaying a second graphical user interface subsequent to displaying the first graphical user interface, wherein the second graphical user interface comprises first and second graphical elements corresponding to the one of the computer systems of the second system rack and another of the computer system of the second system rack, respectively, contained within the second system rack, and wherein the second graphical user interface comprises visual information identifying the location of the second system rack on the floor within the data center.

19. An apparatus comprising:
  first computer system coupled to computer systems contained in a first system rack and computer systems contained in a second system rack, wherein the first and second system racks are contained in a data center;
  wherein the first computer system comprises a memory for storing computer executable instructions, where a method is performed by the first computer system in response to executing the instructions, the method comprising:
  sending messages to the computer systems in the first system rack and the second system rack;
  receiving replies from the computer systems in the first system rack;
  receiving replies from all but one of the computer systems in the second system rack;
  generating a first graphical user interface, wherein the first graphical user interface comprises first and second graphical elements corresponding to the first and second system racks, respectively;
  wherein the first graphical element comprises first visual information and a first visual indication, the first visual information identifying a location of the first system rack on a floor within the data center, and the first visual indication indicating that all of the computer systems of the first system rack are operable, and;
  wherein the second graphical element comprises second visual information and a second visual indication, the second visual information identifying a location of the second system rack on the floor within the data center, and the second visual indication indicating that all but the one of computer systems of the second system rack is inoperable;

subsequent to displaying the first graphical user interface, generating another graphical user interface that comprises visual information regarding the one of the computer systems of the second system rack;

wherein the visual information regarding the one of the computer systems of the second system rack comprises visual information regarding computer type and model description, operating system, memory size, or number of central processing units (CPUs);

wherein the visual information regarding the one of the computer systems of the second system rack comprises visual information identifying the location of the second system rack on the floor within the data center.

20. The apparatus of claim 19 wherein the method further comprises an act of displaying a second graphical user interface subsequent to displaying the first graphical user interface, wherein the second graphical user interface comprises first and second graphical elements corresponding to the one of the computer systems of the second system rack and another of the computer system of the second system rack, respectively, contained within the second system rack, and wherein the second graphical user interface comprises visual information identifying the location of the second system rack on the floor within the data center.

21. A method comprising:
sending messages to computer systems in a first system rack and
in a second system rack;
the computer systems in the first system rack receiving the first messages, respectively;
the computer systems in the second system rack receiving the second messages, respectively;
the computer systems in the first system rack sending replies to the first messages, respectively;
all but one of the computer systems in the second system rack sending replies to the second messages, respectively;
displaying a first graphical user interface, wherein the first graphical user interface comprises first and second graphical elements corresponding to the first and second system racks, respectively;

wherein the first graphical element comprises first visual information and a first visual indication, the first visual information identifying a location of the first system rack on a floor within a data center, and the first visual indication indicating that all of the computer systems of the first system rack are operable, and;

wherein the second graphical element comprises second visual information and a second visual indication, the second visual information identifying a location of the second system rack on the floor within the data center, and the second visual indication indicating that the one of the computer systems of the second system rack is inoperable;

subsequent to displaying the first graphical user interface, displaying another graphical user interface that comprises visual information regarding the one of the computer systems of the second system rack;

wherein the visual information regarding the one of the computer systems of the second system rack comprises an identity of at least one hardware or software component contained in the one of the computer systems of the second system rack;

wherein the visual information regarding the one of the computer systems of the second system rack comprises visual information identifying the location of the second system rack on the floor within the data center.

22. The method of claim 21 further comprising an act of displaying a second graphical user interface subsequent to displaying the first graphical user interface, wherein the second graphical user interface comprises first and second graphical elements corresponding to the one of the computer systems of the second system rack and another of the computer system of the second system rack, respectively, contained within the second system rack, and wherein the second graphical user interface comprises visual information identifying the location of the second system rack on the floor within the data center.

* * * * *

UNITED STATES PATENT AND TRADEMARK OFFICE
CERTIFICATE OF CORRECTION

Page 1 of 1

PATENT NO. : 8,533,601 B2
APPLICATION NO. : 11/850844
DATED : September 10, 2013
INVENTOR(S) : LaForest It is certified that error appears in the above-identified patent and that said Letters Patent is hereby corrected as shown below:

In the Specifications

In column 2, line 38, delete "on" and insert -- one --, therefor.

Signed and Sealed this
Seventeenth Day of December, 2013

Margaret A. Focarino
*Commissioner for Patents of the United States Patent and Trademark Office*